(12) United States Patent
Wei et al.

(10) Patent No.: US 8,915,646 B2
(45) Date of Patent: Dec. 23, 2014

(54) HIGH ACCURACY TEMPERATURE SENSOR

(75) Inventors: Changming Wei, Shanghai (CN);
Yonggang Chen, Johns Creek, GA (US)

(73) Assignee: Integrated Device Technology, Inc.,
San Jose, CA (US)

( * ) Notice: Subject to any disclaimer, the term of this patent is extended or adjusted under 35 U.S.C. 154(b) by 127 days.

(21) Appl. No.: 13/435,950

(22) Filed: Mar. 30, 2012

(65) Prior Publication Data

US 2013/0259091 A1    Oct. 3, 2013

(51) Int. Cl.
*G01K 7/00* (2006.01)

(52) U.S. Cl.
USPC ........................................... 374/178; 341/155

(58) Field of Classification Search
CPC ...................................................... G01K 7/01
USPC .......... 374/169–172, 184; 341/143, 155, 110, 341/126, 140, 146, 77
See application file for complete search history.

(56) References Cited

U.S. PATENT DOCUMENTS

| | | | | |
|---|---|---|---|---|
| 5,305,004 A * | 4/1994 | Fattaruso | ...................... | 341/120 |
| 6,019,508 A * | 2/2000 | Lien | ................ | 374/178 |
| 6,344,812 B1 * | 2/2002 | Takeda et al. | ................ | 341/143 |
| 6,744,392 B2 * | 6/2004 | Melanson | ...................... | 341/143 |
| 6,788,236 B2 * | 9/2004 | Erdogan et al. | ................ | 341/155 |
| 7,129,875 B1 * | 10/2006 | Altun et al. | .................... | 341/143 |
| 7,136,006 B2 * | 11/2006 | Koh et al. | ...................... | 341/172 |
| 7,167,119 B1 * | 1/2007 | Lei et al. | ........................ | 341/143 |
| 7,686,508 B2 * | 3/2010 | Lin et al. | ...................... | 374/178 |
| 7,746,258 B2 * | 6/2010 | Park | ............................. | 341/144 |
| 7,777,658 B2 * | 8/2010 | Nguyen et al. | ................ | 341/143 |
| 7,944,378 B1 * | 5/2011 | Pesenti | ........................ | 341/118 |
| 2006/0193370 A1 * | 8/2006 | St. Pierre et al. | ............ | 374/178 |
| 2008/0095213 A1 * | 4/2008 | Lin et al. | ...................... | 374/170 |

OTHER PUBLICATIONS

Mike Tuthill, "A Switched-Current, Switched-Capacitor Temperature Sensor in O.6-um CMOS", IEEE Journal of Solid-State Circuits. vol. 33. No. 7. Jul. 1998, pp. 1117-1123.*

* cited by examiner

*Primary Examiner* — Lisa Caputo
*Assistant Examiner* — Nasir U Ahmed
(74) *Attorney, Agent, or Firm* — Tracy Parris

(57) ABSTRACT

Temperature accuracy is improved, conversion gain is increased without increasing current density and parasitic resistance errors and other problems with conventional bandgap reference temperature sensors are eliminated by generating a signal proportional to temperature from three samples, where the signal is defined as a difference between a first difference and a second difference, the first difference comprising a difference between a second sample and a first sample, the second difference comprising a difference between a third sample and the first sample, and where the signal is defined to cancel parasitic components in the first, second and third samples.

20 Claims, 4 Drawing Sheets

HIGH ACCURACY TEMPERATURE SENSOR

TECHNICAL FIELD

The present invention generally relates to temperature detection. More particularly, the invention pertains to temperature sensors, sensor stimulation, sensor sampling and sample processing to obtain a signal proportional to temperature.

BACKGROUND

Temperature sensors are widely used in instrumentation and control systems, e.g., to monitor thermal conditions. There are a variety of types of temperature sensors, such as thermistors, resistance temperature detectors (RTDs), thermocouples and Silicon PN junction sensors. An advantage of a Silicon PN junction sensor is that it is easily integrated with Silicon circuitry that process sensor signals, such as an analog to digital converter (ADC) and voltage to temperature converter, which improves the accuracy and cost of a temperature detector system. A bandgap reference temperature sensor is a type of Silicon PN junction sensor.

FIG. 1 illustrates a conventional bandgap reference temperature detection system. Conventional temperature detection system 100, which generates an output signal, conventional temp, comprises conventional stimulator 110, conventional temp sensor 120, conventional sigma-delta ADC 130 and conventional voltage to temperature converter 160. Conventional stimulator 110 comprises first and second p-channel Metal Oxide Semiconductor Field Effect Transistors (MOSFETs) M1P, M2P. Conventional temp sensor 120 comprises PNP Bipolar Junction Transistors (BJTs) Q1P, Q2P, first and second resistors R1, R2 and op amp 125. Conventional sigma-delta (ΣΔ) ADC (analog to digital converter) 130 comprises conventional sigma delta modulator 140 and conventional digital filter 150.

In conventional stimulator 110, source terminals of first and second FETs M1P, M2P are coupled to power supply VDD. Gate terminals of first and second FETs M1P, M2P are coupled to and controlled by the output of op amp 125. The drain terminal of first FET M1P is coupled to one terminal of second resistor R2. The drain terminal of second FET M2P is coupled to a positive input of op amp 125 and a terminal of first resistor R1. A second terminal of second resistor is coupled to an emitter terminal of first BJT Q1P. A second terminal of first resistor R1 is coupled to an emitter terminal of second BJT Q2P. First and second BJTs Q1P, Q2P are diode-connected. The base and collector terminals of each of first and second BJTs Q1P, Q2P are coupled to ground. A bandgap reference voltage $V_{REF}$ is drawn from the drain terminal of first FET M1P. A differential change in voltage across first resistor R1 is coupled to a differential input of conventional sigma delta modulator 140. A digital output of conventional sigma delta modulator 140 is coupled to the input of conventional digital filter 150. Conventional digital filter 150 removes high frequency noise caused by sigma delta modulator 140. The digital output of conventional digital filter 150 is provided to conventional voltage to temperature converter 160, which generates conventional temperature CTemp.

First and second FETs M1P, M2P are designed to be the same and to generate the same current in a current mirror. First and second BJTs Q1P, Q2P are designed to be different. The emitter area of second BJT Q2P is m times larger than the emitter area of first BJT Q1P. The current through first and second BJTs Q1P, Q2P is the same, but the current density in each of them is m times different. Since the emitter of second BJT Q2P is m times larger than the emitter of first BJT Q1P, the current density in second BJT Q2P is m times lower than the current density in first BJT Q1P. Op amp 125 causes the voltage at the emitter of first BJT Q1P, i.e., $V_{BE1}$, to be the same as the voltage at the emitter of second BJT Q2P, i.e., $V_{BE2}$, plus the voltage across first resistor R1, i.e., $V_{R1}$, which renders $V_{R1}$ equivalent to $V_{BE1}-V_{BE2}$ or $\Delta V_{BE}$. This voltage is proportional to absolute temperature (PTAT).

Given that M1P and M2P are designed to be the same, given that the emitter area of second BJT Q2P is m times larger than the emitter area of first BJT Q1P and given that the base of first and second BJTs Q1P, Q2P are coupled to ground, the base to emitter voltages $V_{BE1}$, $V_{BE2}$ for respective first and second BJTs Q1P, Q2P are given by equations 1.1 and 1.2:

$$V_{BE1} = \frac{kT}{q}\ln\left(\frac{I_{C1}}{I_{s1}}\right) \quad \text{Equation 1.1}$$

$$V_{BE2} = \frac{kT}{q}\ln\left(\frac{I_{C2}}{I_{s2}}\right) \quad \text{Equation 1.2}$$

where k is Boltzmann's constant, T is the temperature in Kelvins, q is the charge of an electron, $I_{C1}$ is the current through the collector of first BJT Q1P, $I_{C2}$ is the current through the collector of second BJT Q2P, $I_{S1}$ is the saturation current of first BJT Q1P, $I_{S2}$ is the saturation current of second BJT Q2P and ln is the natural logarithm function. Since the emitter area of Q2P is m times of Q1P, $I_{S2}$ is m times of $I_{S1}$.

Since the current through collector terminals of first and second BJT Q1P, Q2P is the same, i.e., $I_{C1}=I_{C2}$, the difference $\Delta V_{BE}$ between base to emitter voltages $V_{BE1}$ and $V_{BE2}$, which is the voltage across first resistor R1, is given by equation 1.3:

$$\Delta V_{BE} = V_{BE1} - V_{BE2} = \frac{kT}{q}\ln\left(\frac{I_{C1}I_{s2}}{I_{s1}I_{C2}}\right) = \frac{k}{q}\ln(m)\cdot T \quad \text{Equation 1.3}$$

The voltage across the first resistor R1 is proportional to absolute temperature (PTAT). Accordingly, the junction voltage difference $\Delta V_{BE}$ is referred to as the PTAT voltage. If the current density m were designed to be 8, at room temperature of 300 Kelvins, the difference $\Delta V_{BE}$ between base to emitter voltages $V_{BE1}$ and $V_{BE2}$ is approximately 53.7 mV according to Equation 1.3.

Bandgap reference voltage $V_{REF}$ can be determined relative to the junction voltage difference $\Delta V_{BE}$ between base to emitter voltages $V_{BE1}$ and $V_{BE2}$. First and second FETs M1P, M2P are the same size, have the same gate to source terminal voltage $V_{GS1}$, $V_{GS2}$ and have the same drain current $I_{D1}$, $I_{D2}$. Second drain current $I_{D2}$ is equivalent to the difference $\Delta V_{BE}$ between base to emitter voltages $V_{BE1}$ and $V_{BE2}$ divided by first resistor R1. Accordingly, bandgap reference voltage $V_{REF}$ is given by equation 1.4:

$$V_{REF} = V_{BE1} + \frac{\Delta V_{BE}}{R_1}\cdot R_2 = V_{BE1} + \frac{R_2}{R_1}\frac{k}{q}\ln(m)\cdot T \quad \text{Equation 1.4}$$

Adjustment of the ratio of first and second resistors R1 and R2 compensates the temperature coefficient of bandgap reference voltage $V_{REF}$. The objective is to render bandgap reference voltage $V_{REF}$ with zero temperature coefficient, i.e., independent of temperature fluctuations, so that it can be a temperature independent reference voltage. Temperature independent bandgap reference voltage $V_{REF}$ is an input to conventional sigma delta modulator 140.

In conventional sigma delta ADC 130, conventional sigma delta modulator 140 and conventional digital filter 150 use PTAT voltage $\Delta V_{BE}$ and temperature independent bandgap reference voltage $V_{REF}$ to generate a digital voltage ready to be converted to temperature by conventional voltage to temperature converter 160. The output of conventional voltage to temperature converter 160 is conventional temperature measurement CTemp.

There are a number of problems with conventional temperature detection systems such as conventional temperature detection system 100. Generally, it is difficult to manufacture a highly accurate Silicon PN junction sensor because the PTAT voltage $\Delta V_{BE}$ is only tens of milliVolts (mV), with only a few tenths mV change for each degree Kelvin of temperature variation, there may be mismatch between first and second FETs M1P, M2P, mismatch between first and second resistors R1 and R2, mismatch from the current density m between first and second BJTs Q1P, Q2P, all of which may cause several degrees of error in PTAT voltage $\Delta V_{BE}$. Generally, these and other problems require substantial post-processing (e.g. trimming, calibration circuitry) to correct conventional temperature output CTemp. In greater detail, eight specific problems are addressed below.

First, equations 1.1-1.4 are for ideal behavior of conventional stimulator 110 and conventional temp sensor 120. However, operation of their components is unlikely to be ideal. This may induce an error in PTAT voltage $\Delta V_{BE}$. Accordingly adjustments may be necessary.

Second, the actual current density ratio between first and second BJTs Q1P, Q2P may not be exactly the current density ratio m that the design and equations 1.1-1.4 are based on. This may induce an error in PTAT voltage $\Delta V_{BE}$. Accordingly adjustments may be necessary.

Third, there may be a Beta β (i.e. $I_c/I_b$) mismatch for first and second BJTs Q1P, Q2P at different current densities. In standard CMOS fabrication processes, the only available options for BJTs is lateral PNP, which have lower current gain. Equations 1.1-1.4 are for collector current, but they need to be modified for emitter current in accordance with Equations 1.5-1.7 below:

$$V_{BE1} = \frac{kT}{q} \ln\left(\frac{I_{E1}}{(1+\beta_{F1})I_{s1}}\right) \quad \text{Equation 1.5}$$

$$V_{BE2} = \frac{kT}{q} \ln\left(\frac{I_{E2}}{(1+\beta_{F2})I_{s2}}\right) \quad \text{Equation 1.6}$$

$$\Delta V_{BE} = V_{BE1} - V_{BE2} = \quad \text{Equation 1.7}$$
$$\frac{kT}{q}\ln\left(\frac{I_{E1}I_{s2}}{I_{E2}I_{s1}}\frac{(1+\beta_{F2})}{(1+\beta_{F1})}\right) = \frac{k}{q}\ln\left(m\frac{(1+\beta_{F2})}{(1+\beta_{F1})}\right) \cdot T$$

Equations 1.4-1.7 show that current density cannot be too large and that biasing points must be carefully selected to try to make forward gain nearly constant in order to render Beta factors negligible. Of course this is difficult to accomplish and adjustments may be necessary.

Fourth, mismatch in the current mirror created by first and second FETs M1P, M2P may cause the bias currents in first and second BJTs Q1P, Q2P to be different. Such an error would mean current density m is something other than m, which would result in an error in PTAT voltage $\Delta V_{BE}$. Accordingly adjustments may be necessary.

Fifth, parasitic resistance exists between terminals and components. For examples, a parasitic resistance RC is in series with the collectors of first and second BJTs Q1P, Q2P. The voltage detected always includes voltage across parasitic resistance. This may induce an error in PTAT voltage $\Delta V_{BE}$. Accordingly adjustments may be necessary.

Sixth, an offset voltage may exist due to op amp 125. This may induce an error in PTAT voltage $\Delta V_{BE}$. Accordingly adjustments may be necessary.

Seventh, analog to digital conversion may introduce errors and be reflected as an error in PTAT voltage $\Delta V_{BE}$. Accordingly adjustments may be necessary.

Eighth, an error in bandgap reference voltage $V_{REF}$ will be reflected as an error in PTAT voltage $\Delta V_{BE}$. Accordingly adjustments may be necessary.

These problems are typical in conventional temperature detection systems. With so many adjustments necessary to compensate for so many so many sources of errors, such as non-ideal components and non-ideal performance, it is inevitable that conventional temperature output CTemp will contain errors. Thus, there is a need for a temperature detection technique that eliminates or reduces the impact of common sources of error.

SUMMARY

This Summary is provided to introduce concepts in a simplified form. These concepts are described in greater detail below in the sections with accompanying figures entitled Detailed Description Of Illustrative Embodiments, Brief Description of the Drawings, Claims and in FIGS. 2-6. This Summary is not intended to identify key or essential features of the described or claimed subject matter, nor limit the scope thereof.

Temperature accuracy is improved, conversion gain is increased without increasing current density, and parasitic resistance errors and other problems with conventional bandgap reference temperature sensors are eliminated by generating a signal proportional to temperature from three samples, where the signal is defined as a difference between a first difference and a second difference, the first difference comprising a difference between a second sample and a first sample, the second difference comprising a difference between a third sample and the first sample, and where the signal is defined to cancel parasitic components in the first, second and third samples.

A device in accordance with an embodiment of the invention may comprise, for example, a signal generator that generates a signal proportional to temperature from first, second and third samples of a temperature sensor, where the signal is defined as a difference between a first difference and a second difference, the first difference comprising a difference between the second sample and the first sample, the second difference comprising a difference between the third sample and the first sample, and where the signal is defined to cancel parasitic components in the first, second and third samples. The signal generator adjusts the magnitude of at least one of the samples to cancel parasitic components. A sampler samples a temperature sensor to generate a set of samples comprising first, second and third samples. A temperature sensor may comprise a fixed or variable sensor, such as a single transistor that generates a first, second and third response in response to being stimulated. A sensor stimulator may be fixed or variable, such as a reconfigurable stimulator that, in a first, second and third configuration, generates the first, second and third stimulus. Many different sample processing techniques may be employed, such as sampling first, second and third samples to first, second and third capacitors having first, second and third magnitudes followed by processing, such as differential integration and analog to digital conversion.

A method in accordance with an embodiment of the invention may comprise, for example, sampling a temperature sensor to generate first, second and third samples and generating a signal proportional to temperature from the first, second and third samples, where the signal is defined as a difference between a first difference and a second difference, the first difference comprising a difference between the second sample and the first sample, the second difference comprising a difference between the third sample and the first sample, and where the signal is defined to cancel parasitic components in the first, second and third samples. One or both a temperature sensor and a temperature sensor stimulator may be fixed or variable, e.g., reconfigurable into a first, second and third configuration. Each stimulus may be the same or may have a different magnitude. The magnitude of one or more of the first, second and third samples may be adjusted to cancel parasitic components. For example, the first second and third samples may be sampled to capacitors having different magnitudes. Dynamic element matching (DEM) may be used to reconfigure a reconfigurable stimulator, temperature sensor, sampling capacitors, etc.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments of the present invention and, together with the description, further serve to explain the principles involved and to enable a person skilled in the relevant art(s) to make and use the disclosed technologies. However, embodiments of the invention are not limited to the specific implementations disclosed herein. Each figure represents a different embodiment rather than a different view of the same embodiment. Similarities between portions of embodiments are indicated by use of the same references for particular components.

FIG. 2*ii* illustrates an exemplary temperature detection system in accordance with an embodiment of the invention.

FIG. 4*ii* illustrates an exemplary fixed stimulator and variable sensor in accordance with an embodiment of the invention.

DETAILED DESCRIPTION OF ILLUSTRATIVE EMBODIMENTS

Figure 1:
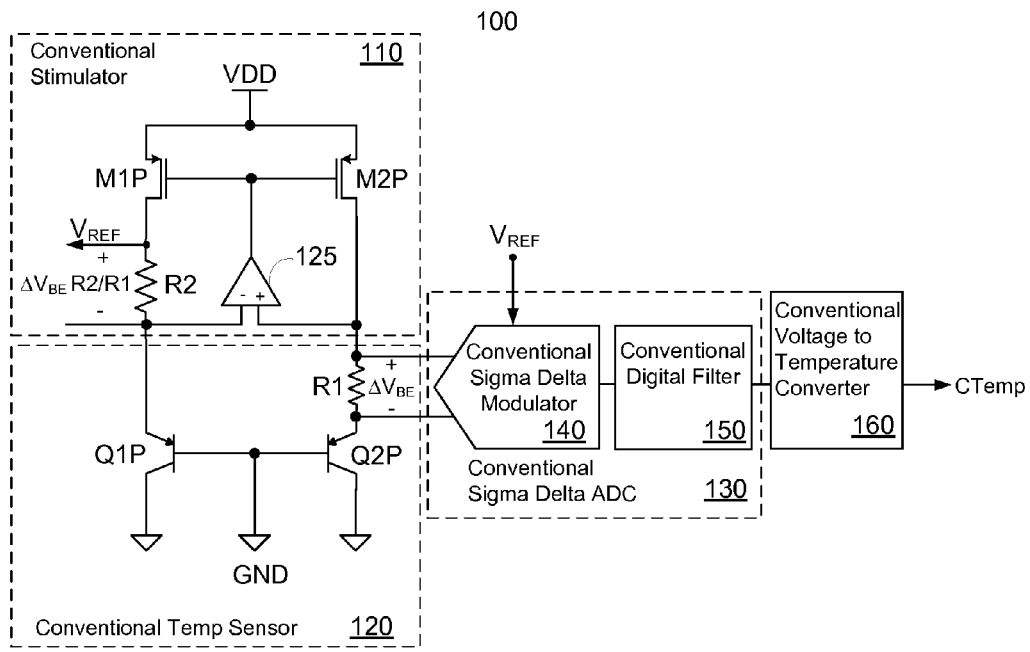
FIG. 1 illustrates an exemplary conventional temperature detection system using a bandgap reference temperature sensor.

Reference will now be made to embodiments of the invention, examples of which are illustrated in the accompanying drawings. While the technology will be described in conjunction with various embodiments, it will be understood that the embodiments are not intended to limit the present technology. On the contrary, the present technology is intended to cover alternatives, modifications, and equivalents, which may be included within the spirit and scope the various embodiments as defined herein, including by the appended claims. In addition, in the following detailed description, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the embodiments presented.

References in the specification to "embodiment," "example embodiment," or the like, indicate that the embodiment described may include a particular feature, structure, characteristic or step, but every embodiment may not necessarily include the particular feature, structure, characteristic or step. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Unless specifically stated otherwise, terms such as "sampling," "latching," "determining," "selecting" "storing," "registering," "creating," "including," "comparing," "receiving," "providing," "generating," "associating," and "arranging", or the like, refer to the actions and processes of an electronic device that manipulates and transforms data represented as physical (electronic) quantities within the electronic device. The terms "logic," "function," "step," and the like refer to functionality that may be implemented by hardware (digital and/or analog) or a combination of hardware, software and/or firmware. Unless specifically indicated, described and claimed functionality may be implemented by hardware (digital and/or analog) or a combination of hardware, software and/or firmware. The term "programmable" and the like refer to functionality permitting definition or selection of functionality to vary performance of logic from one embodiment to the next, whether one-time or any number of times such as by reprogrammable functionality.

Certain terms are used throughout the following description and claims to refer to particular system components and configurations. As one skilled in the art will appreciate, various skilled artisans and companies may refer to a component by different names. The discussion of embodiments is not intended to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection or though an indirect electrical connection through other components, devices and connections. Furthermore, the term "information" is intended to refer to any data, instructions, or control sequences that may be communicated between components of a device. For example, if information is sent between two components, data, instructions, control sequences, or any combination thereof may be sent between the two components.

Figure 2I:
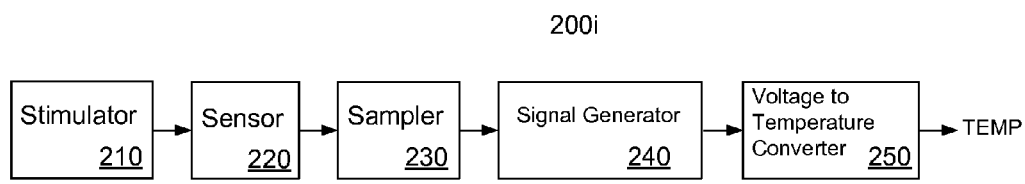
FIG. 2*i* illustrates an exemplary temperature detection system in accordance with an embodiment of the invention.
Figure 2I:
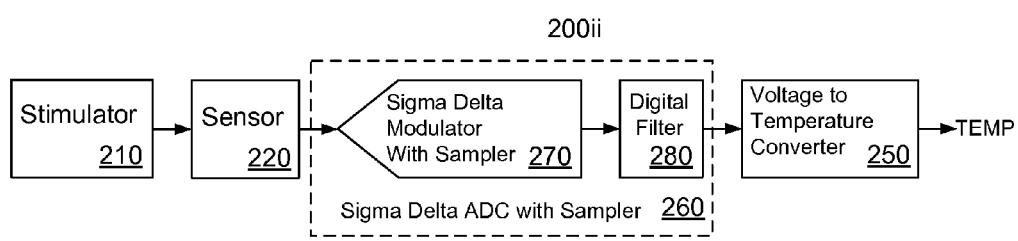
Figure 3:
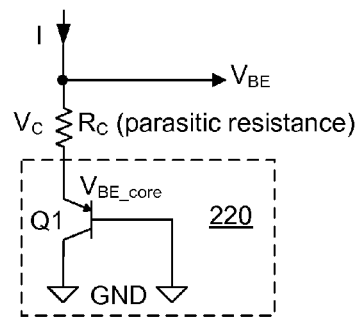
FIG. 3 illustrates an exemplary single transistor temperature sensor in accordance with an embodiment of the invention.
Figure 4I:
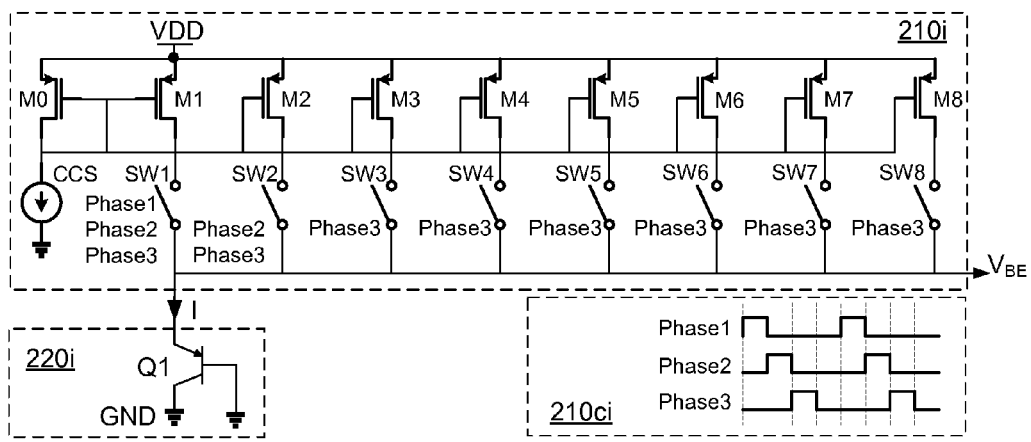
FIG. 4*i* illustrates an exemplary variable stimulator and fixed sensor in accordance with an embodiment of the invention.
Figure 4I:
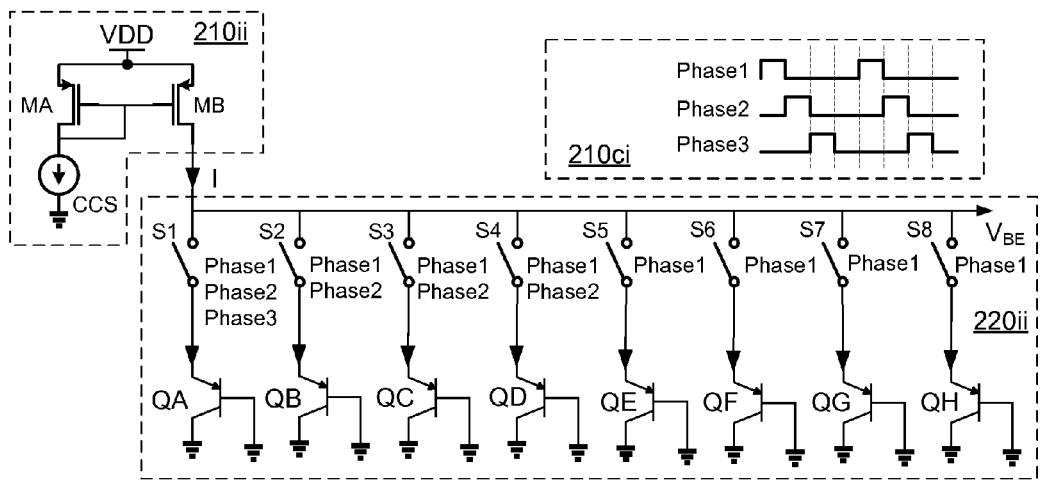
Figure 6:
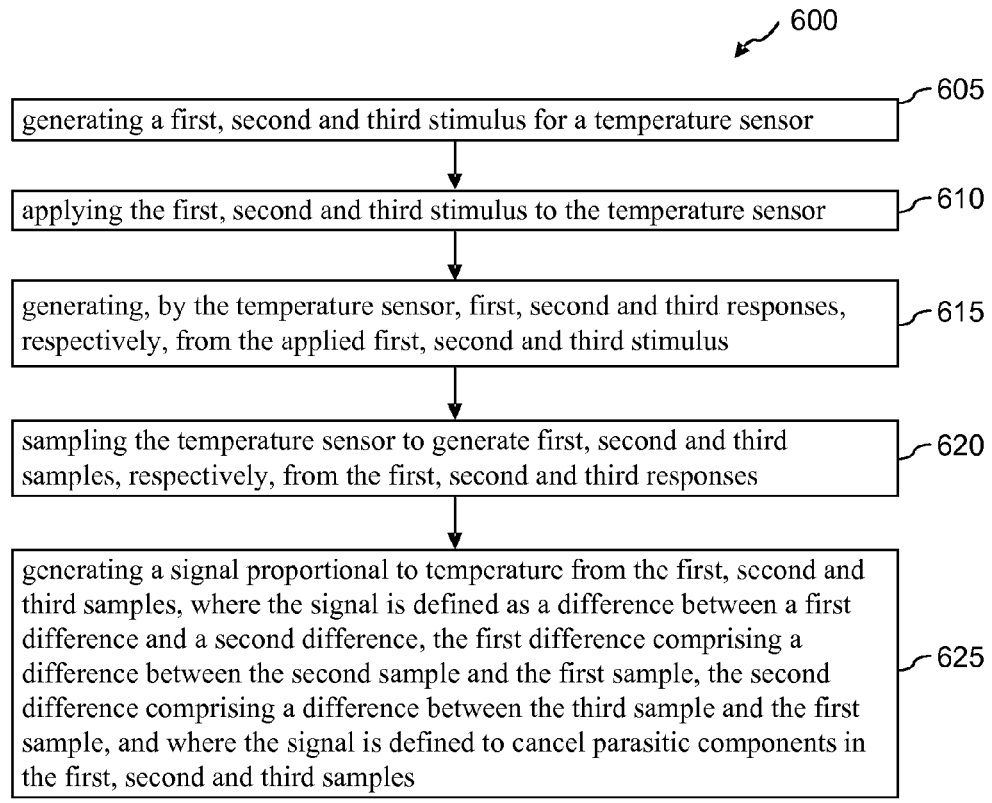
FIG. 6 illustrates an exemplary method of generating a signal proportional to temperature in accordance with an embodiment of the invention.

FIGS. 2*i* and 2*ii* illustrate exemplary functional block diagram embodiments of exemplary temperature detection systems while FIGS. 3, 4*i*, 4*ii*, 5*a*, 5*b* and 5*c* illustrate exemplary detailed embodiments of the exemplary blocks in FIGS. 2*i* and 2*ii*. FIG. 6 illustrates exemplary steps in an embodiment of the invention. Embodiments of the invention are not limited to the functional blocks, detailed examples, steps, order or the entirety of subject matter presented in the figures, which is why the figures are referred to as exemplary embodiments.

FIGS. 2*i* and 2*ii* illustrate exemplary temperature detection systems in accordance with embodiments of the invention. Temperature detection system 200*i* comprises stimulator 210, sensor 220, sampler 230, signal generator 240 and voltage to temperature converter 250. Temperature detection system 200*ii* comprises stimulator 210, sensor 220, sigma delta ADC with sampler 260 and voltage to temperature converter 250. Sigma delta ADC with sampler 260 comprises sigma delta modulator with sampler 270 and digital filter 280. Embodiments of the invention may be implemented in one, several, all or alternative functional blocks.

Exemplary detection systems 200*i*, 200*ii*, may implement method 600 in FIG. 6. FIG. 6 illustrates an exemplary method of generating a signal proportional to temperature in accordance with an embodiment of the invention. Method 600 comprises steps 605-625, although other embodiments may comprise more or fewer, same or different steps. As illustrated in steps 605 and 610, stimulator 210 may generate and apply a first, second and third stimulus to a temperature sensor 220. As illustrated in step 615, sensor 220 may generate first, second and third responses, respectively, from the applied first, second and third stimulus. As illustrated in step 620, sampler 230 or sigma delta modulator with sampler 270 may sample the temperature sensor 220 to generate first, second and third samples, respectively, from the first, second and third responses. As illustrated in step 625, signal generator 240 or sigma delta modulator with sampler 270 may generate a signal proportional to temperature from the first, second and third samples, where the signal is defined as a difference between a first difference and a second difference, the first difference comprising a difference between the second sample and the first sample, the second difference comprising a difference between the third sample and the first sample, and where the signal is defined to cancel parasitic components in the first, second and third samples. A signal proportional to temperature may be provided to voltage to temperature converter 250 for conversion to a temperature TEMP.

It is important to realize that temperature detection systems 200*i* and 200*ii* are simply two examples out of many possible embodiments. Functional blocks may be implemented in hardware or a combination of hardware and software or firmware. Functional blocks may be analog, digital or a combination thereof. Functional blocks presented in temperature detection systems 200*i*, 200*ii* may be reorganized, joined, separated, replaced, eliminated, etc. in various embodiments of the invention. For example, stimulator 210 and sensor 220 may be joined in a temperature sensor. Sigma delta ADC with sampler 260 may be replaced with any ADC. Sampler 230 may be independent, joined with a temperature sensor, or, as shown in FIG. 2*ii*, joined with an ADC.

Signal generator 240 may take many different forms in many different embodiments. An ADC is unnecessary if signal processing remains in the analog domain. For example, a voltage sample from a temperature sensor, e.g., sensor 220, can be sampled and held, e.g., by sampler 230, in one or more capacitors. In an analog signal generator 240, the sampled and held voltage can be used to generate a corresponding current, a current mirror could scale (multiply or divide) the current, an add/subtract circuit could sum the processed samples together, the resulting current could flow through a resistor to generate a PTAT voltage and a voltage to temperature converter, e.g., voltage to temperature converter 270, could convert the PTAT voltage to a temperature. The point is that any temperature detection system component may be used that generates a signal proportional to temperature from first, second and third samples of a temperature sensor, where the signal is defined as a difference between a first difference and a second difference, the first difference comprising a difference between the second sample and the first sample, the second difference comprising a difference between the third sample and the first sample, and where the signal is defined to cancel parasitic components in the first, second and third samples.

Stimulator 210 may be fixed or variable, e.g., reconfigurable, and may comprise one or more stimulus generators, e.g., transistors, that generate a first, second and third stimulus. Regardless whether stimulator is fixed or reconfigurable into first, second and third configurations, each stimulus may be the same or different and may depend on type of sensor 220 and the algorithm to generate a signal proportional to temperature. Sensor 220 may be fixed or variable, e.g., reconfigurable, and may comprise one or more transistors. In some embodiments, sensor 220 may comprise a single transistor that generates a first, second and third responses in response to being stimulated by a first, second and third stimulus. In other embodiments, sensor 220 may comprise a plurality of selectable transistors configurable into first, second and third configurations that generate first, second and third responses in response to being stimulated by a first, second and third stimulus. FIGS. 4*i* and 4*ii* illustrate two of many embodiments of stimulator 210 and sensor 220.

Problems with conventional temperature sensors may be reduced or eliminated by selecting stimulator 210, sensor 220 and the sensor stimulation and signal processing algorithm. Some problems may be eliminated by the choice of sensor 220, some problems may be eliminated by the choice of stimulator 210 and still other problems may be eliminated by the choice of stimulation and signal processing algorithm. Regarding selection of sensor 220, a temperature sensor comprising a single transistor may eliminate problems with conventional temperature sensors. As one example, there is no problem involving a mismatch between multiple transistors if sensor 220 comprises only one transistor.

Problems may also be eliminated by the choice of stimulator to stimulate sensor 220. For example, avoiding the use of an op amp in the stimulator avoids offset caused by an op amp. Further, mismatch between multiple bias currents or failure to implement a particular bias current ratio in a processing algorithm may be reduced or eliminated by using a variable stimulator. A variable stimulator may comprise a plurality of selectable transistors, e.g., MOSFET current branches. Selecting among available current branches may dither, average or randomize mismatch between current branches to reduce or eliminate bias current mismatch.

Problems may also be eliminated by the choice of stimulation and signal processing algorithm. The stimulation and signal processing algorithm may reduce or eliminate parasitic resistance in temperature sensor junction voltage samples and may provide a higher conversion gain without increasing current density ratio. There may be tradeoffs between solutions to problems identified for convention temperature sensors. For example, a high conversion gain, i.e., gain of temperature to junction voltage VBE, increases the accuracy of the signal proportional to temperature. A high conversion gain also reduces resolution requirements for an ADC to handle low magnitude signals. However, high conversion gain generally requires a high current density ratio, which can push transistor performance into the edges of ideal and into non-ideal territory. This results in amplification of nonlinearities in transistor temperature sensor performance, with the end result being reduced temperature detection accuracy. Once this occurs, equations and algorithms need to be manipulated to reflect device behavior and correct errors. As will be seen, some embodiments of the invention permit a higher conversion gain without increasing the current density ratio.

FIG. 3 illustrates an exemplary single transistor temperature sensor in accordance with an embodiment of the invention. In the embodiment shown in FIG. 3, sensor 220 comprises a single pnp BJT Q1. BJT Q1 is diode-connected, which means the base and collector terminals are coupled to ground GND. This is one example of a fixed sensor 220. In addition, FIG. 3 illustrates the problem of parasitic resistance. As shown in FIG. 3, sensor 220 is always accompanied by parasitic resistance $R_C$, such that junction voltage $V_{BE}$ will always be misrepresented by Equation 3.1.

$$V_{BE} = IR_C + V_{BE\_core} \quad \text{Equation 3.1}$$

Among other improvements embodiments of the present invention reduce or eliminate this problem of parasitic resistance and parasitic components present in temperature sensor samples, such as junction voltage $V_{BE}$. An exemplary stimulation, sampling and signal processing technique to reduce or eliminate problems with conventional temperature sensors is discussed next.

Application of different stimulus currents to temperature sensor BJT Q1 will generate different junction voltages $V_{BE\_core}$ and $V_{BE}$. For example, application of first, second and third stimulus currents I, 2I and 8I to temperature sensor BJT Q1 generate respective first, second and third junction voltages $V_{BE1}$, $V_{BE2}$ and $V_{BE3}$ according to Equations 3.2, 3.3 and 3.4.

$$V_{BE1} = IR_C + V_{BE\_core1} = IR_C + \frac{kT}{q}\ln(I/I_S) \quad \text{Equation 3.2}$$

$$V_{BE2} = 2IR_C + V_{BE\_core2} = 2IR_C + \frac{kT}{q}\ln(2I/I_S) \quad \text{Equation 3.3}$$

$$V_{BE3} = 8IR_C + V_{BE\_core3} = 8IR_C + \frac{kT}{q}\ln(8I/I_S) \quad \text{Equation 3.4}$$

A first difference $\Delta V_{BE1}$ between $V_{BE2}$ and $V_{BE1}$ is given by Equation 3.5 while a second difference $\Delta V_{BE2}$ between $V_{BE3}$ and $V_{BE1}$ is given by Equation 3.6.

$$\Delta V_{BE1} = V_{BE2} - V_{BE1} = IR_C + \frac{kT}{q}\ln(2) \quad \text{Equation 3.5}$$

$$\Delta V_{BE2} = V_{BE3} - V_{BE1} = 7IR_C + \frac{kT}{q}\ln(8) \quad \text{Equation 3.6}$$

A third difference $\Delta V_{BE3}$ between first difference $\Delta V_{BE1}$ and second difference $\Delta V_{BE2}$ may be generated. However, parasitic components remain in first difference $\Delta V_{BE1}$ and second difference $\Delta V_{BE2}$. It may be observed that an adjustment to the magnitude of the first difference $\Delta V_{BE1}$ will eliminate the parasitic components in the third difference $\Delta V_{BE3}$. More specifically, multiplying the first difference $\Delta V_{BE1}$ by a factor of seven will eliminate the parasitic components in the third difference $\Delta V_{BE3}$. A third difference $\Delta V_{BE3}$ between first difference $\Delta V_{BE1}$ and second difference $\Delta V_{BE2}$ that eliminates parasitic components is given by Equations 3.7 and 3.8.

$$\Delta V_{BE3} = 7\Delta V_{BE1} - \Delta V_{BE2} = \left[\frac{k}{q}\ln\left(\frac{2^7}{8}\right)\right]T = \left[\frac{k}{q}\ln(16)\right]T \quad \text{Equation 3.7}$$

$$\Delta V_{BE3} = \quad \text{Equation 3.8}$$
$$7(V_{BE2} - V_{BE1}) - (V_{BE3} - V_{BE1}) = -6V_{BE1} + 7V_{BE2} - V_{BE3}$$

Equation 3.7 shows that for a current density ratio of 8, the conversion gain can be as high as for a current density of 16 in a conventional bandgap temperature sensor, as indicated by Equation 1.3. Thus, this sampling and signal processing technique increases conversion gain without increasing current density, which avoids increasing non-linear performance of sensor BJTs and which reduces downstream processing requirements for other components, such as an ADC, to maintain accuracy. Equation 3.8 shows that implementation of this technique may involve collecting and processing three samples having particular magnitudes and polarities, i.e. first sample $V_{BE1}$ is multiplied by a magnitude of 6 and a negative polarity, second sample $V_{BE2}$ is multiplied by a magnitude of 7 and a positive polarity and third sample $V_{BE3}$ is multiplied by a magnitude of 1 and a negative polarity.

Third difference $\Delta V_{BE3}$ is proportional to temperature, e.g., proportional to absolute temperature (PTAT). Unlike conventional temperature detection techniques, in some embodiments, $V_{PTAT}$ may be defined as the difference between two differences. Accordingly, a realization of third difference $\Delta V_{BE3}$ is an embodiment of a signal proportional to temperature generated from first, second and third samples (i.e. first sample $V_{BE1}$, second sample $V_{BE2}$ and third sample $V_{BE3}$), where the signal is defined as a difference (i.e. third difference $\Delta V_{BE3}$) between a first difference (i.e. first difference $\Delta V_{BE1}$) and a second difference (i.e. second difference $\Delta V_{BE2}$), the first difference comprising a difference between the second sample and the first sample, the second difference comprising a difference between the third sample and the first sample, and is defined (i.e. first difference $\Delta V_{BE1}$ is multiplied by seven) to cancel parasitic components in the first, second and third samples. Of course, this is only one of many possible embodiments.

Figure 5A:
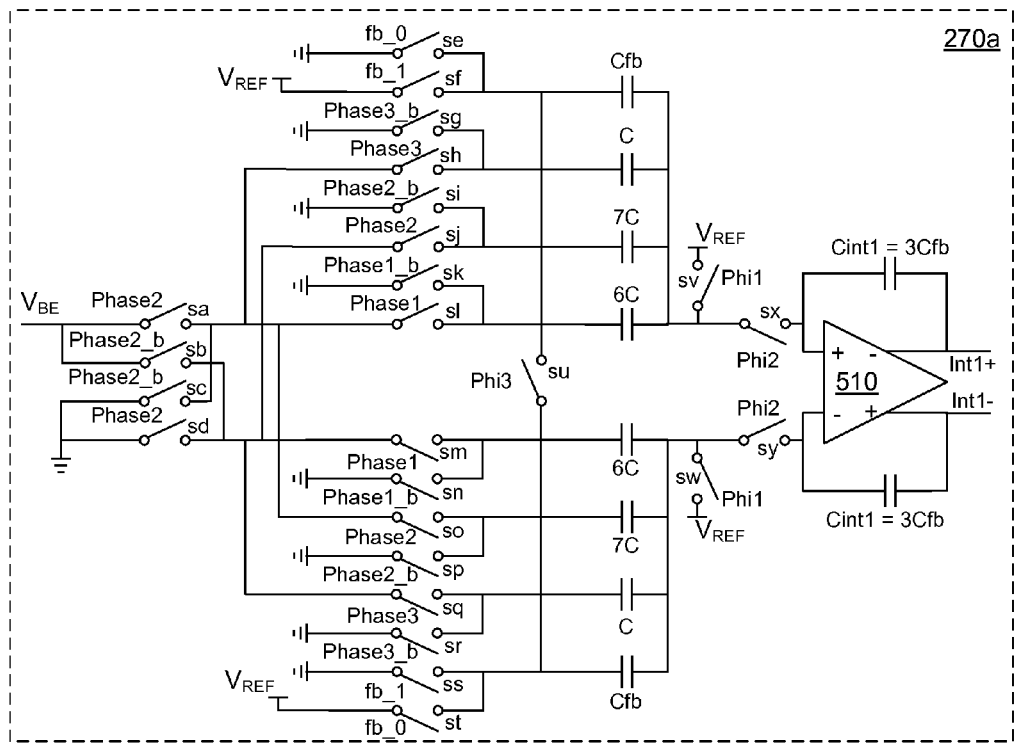
FIG. 5*a* illustrates an exemplary first stage of a sigma delta modulator with sampler in accordance with an embodiment of the invention.
Figure 5B:
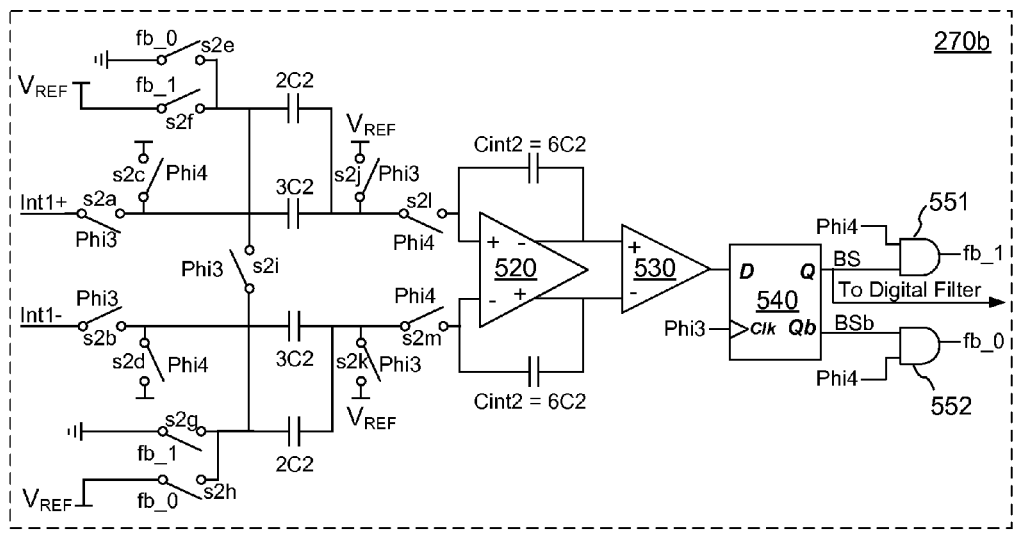
FIG. 5*b* illustrates an exemplary second stage of a sigma delta modulator with sampler in accordance with an embodiment of the invention.
Figure 5C:
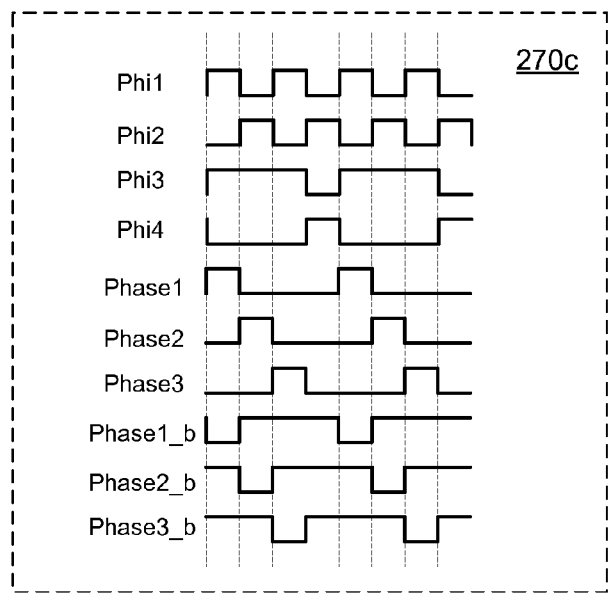
FIG. 5*c* illustrates exemplary control of first and second stages of a sigma delta modulator with sampler in accordance with an embodiment of the invention.

FIGS. 4i, 4ii, 5a, 5b and 5c illustrate several embodiments that realize the temperature detection systems in FIGS. 2i and 2ii and the method in FIG. 6 in accordance with the foregoing stimulus, sampling and signal processing algorithm. FIGS. 4i and 4ii each present an embodiment of a stimulator 210 and a sensor 220. FIGS. 5a, 5b and 5c present an embodiment of sampler 230 and signal generator 240 and, specifically, present an embodiment of sigma delta modulator with sampler 270. It is important to understand that these are only a few of many embodiments. Stimulation ratios, current density ratios, sampling and signal processing may vary between embodiments. Component values for embodiments are selected based on the sampling and signal processing embodiment and based on the configuration embodiment to realize the sampling and signal processing embodiment. Architecture and component values may also be influenced to reduce or eliminate problems common to temperature detection systems. Component limitations may also limit design and implementation. For example, current density may be limited by the "ideal" performance range of transistor temperature sensors.

FIG. 4i illustrates an exemplary variable stimulator and fixed sensor in accordance with an embodiment of the invention. The three main components illustrated in FIG. 4i are variable stimulator 210i, fixed sensor 220i and switch control 210ci. FIG. 4i illustrates both the connections and the operation of variable stimulator 210i and fixed sensor 220i. Fixed sensor 220i comprises BJT Q1. BJT Q1 is a PNP BJT. BJT Q1 is diode-coupled. The collector and base nodes of BJT Q1 are coupled to ground GND. BJT Q1 has its emitter coupled to the output of variable current source 210i, which provides variable current I. Variable stimulator 210i comprises first thru ninth MOSFETs M0-M8, first thru eighth switches SW1-SW8 and constant current source CCS.

First thru ninth FETs M0-M8 are p-channel FETs whose source nodes are coupled to power source VDD and whose base nodes are coupled together and to constant current source CCS. The drain nodes of second thru ninth FETs M1-M8 are coupled to a first terminal of respective first thru eight stimulator switches SW1-SW8. The second terminals of first thru eighth stimulator switches SW1-SW8 are coupled together and to the emitter node of BJT sensor Q1. Thus, second thru ninth FETs M1-M8 are selectable by first thru eighth stimulator switches SW1-SW8.

First thru eighth switches SW1-SW8 may comprise, for example, CMOS switches or transmission gates. Other types of switches may be used in other embodiments. Other types of current generators may be used in other embodiments. The magnitude and variability of power source VDD may also vary between embodiments. Constant current source CSS may be used in some embodiments, but not others.

Accuracy may be improved by matching current source FETs M1-M8. The impact of mismatches can be reduced by using dynamic element matching (DEM), e.g., by rotating the controls for first thru eighth stimulator switches SW1-SW8. For example, if reconfiguration occurs at a rate of 20 kHz and temperature is recorded at a rate of once per second or 60 Hz, there should be little, if any, mismatch effect on recorded temperature number.

First and second FETs M0-M1 form a current mirror, where the current thru constant current source CCS is the current through any one of second thru ninth FETs M1-M9 when they are selected. If one FET is selected, the current thru BJT Q1 is I. If two FETs are selected, the current thru BJT Q1 is 2I. If all eight FETs are selected, the current thru BJT Q1 is 8I. The junction voltage $V_{BE}$ of BJT Q1 may sampled for response of BJT Q1 to the application of each of first, second and third stimulus I, 2I and 8I.

First thru eighth stimulator switches SW1-SW8 are operated by first, second and third control signals Phase1, Phase2 and Phase3. Switch control 210ci presents an exemplary control timing diagram. Each of first, second and third control signals Phase1, Phase2 and Phase3 has a duty cycle of 25% of a four-phase cycle. In the embodiment shown, first control signal Phase1 selects second FET M1 by closing first switch SW1. Second control signal Phase2 selects second and third FETs M1, M2 by closing first and second stimulator switches SW1-SW2. Third control signal Phase3 selects second thru ninth FETS M1-M8 by closing first thru eighth stimulator switches SW1-SW8. To implement this logic, a first OR gate may receive first, second and third control signals Phase1, Phase2 and Phase3 and its output may control first stimulator switch SW1. Similarly, a second OR gate may receive second and third control signals Phase2 and Phase3 and its output may control second stimulator switch SW2. Thus, according to the illustrated embodiment, variable stimulator 210i is configured to consecutively and repetitiously apply to fixed sensor 220i, a first stimulus current of magnitude I, a second stimulus current of magnitude 2I and a third stimulus current of magnitude 8I. The current density ratios developed in BJT Q1 by first, second and third stimulus currents of I, 2I and 8I may be 2:1 and 8:1. Of course the stimulus and current density may vary between embodiments.

An alternative to the combination of stimulator 210i and sensor 220i in FIG. 4i is presented in FIG. 4ii. FIG. 4ii illustrates an exemplary fixed stimulator and variable sensor in accordance with an embodiment of the invention. The three main components illustrated in FIG. 4ii are fixed stimulator 210ii, variable sensor 220ii and switch control 210ci. FIG. 4ii illustrates both the connections and the operation of fixed stimulator 210ii and variable sensor 220ii. Variable sensor 220ii comprises selectable first thru eighth BJTs QA-QH and first thru eight sensor switches S1-S8. First thru eighth BJTs QA-QH are PNP BJTs. First thru eighth BJTs QA-QH are diode-coupled. The collector and base nodes of first thru eighth BJTs QA-QH are coupled to ground GND. First thru eighth BJTs QA-QH have their emitter nodes coupled to a first terminal of a respective one of first thru eighth sensor switches S1-S8. The second terminals of first thru eighth sensor switches S1-S8 are coupled together and to the output of fixed current source 210ii, which provides fixed current I.

Fixed stimulator 210ii comprises first and second MOSFETs MA-MB and constant current source CCS. First and second FETs MA-MB are p-channel FETs whose source nodes are coupled to power supply VDD and whose gate nodes are coupled together and to constant current source CCS. The drain node of first FET MA is coupled to constant current source CCS. The drain node of second FET MB is coupled to the second terminals of respective first thru eight sensor switches S1-S8. Thus, first thru eighth BJTs QA-QH are selectable by first thru eight sensor switches S1-S8.

First and second FETs MA-MB form a current mirror, where the current thru constant current source CCS is the current through second FET MB. The current thru second FET MB is fixed at I. The junction voltage $V_{BE}$ of first thru eighth BJTs QA-QH may be sampled for the application of first, second and third fixed stimulus current I.

First thru eighth sensor switches S1-S8 are operated by control signals Phase1, Phase2 and Phase3. Switch control 210ci presents an exemplary control timing diagram. Each of Phase1, Phase2 and Phase3 have a duty cycle of 25% of a four-phase cycle. In the embodiment shown, Phase1 selects first thru eight BJTs QA-QH by closing first thru eight sensor switches S1-S8. Phase2 selects first thru fourth BJTs QA-QD by closing first thru fourth sensor switches S1-S4. Phase3 selects first BJT QA by closing first sensor switch S1. Basically, there is an OR gate receiving control signals Phase1, Phase2 and Phase3 and the output of the OR gate controls first sensor switch S1. The impact of mismatches can be reduced by using dynamic element matching (DEM), e.g., by rotating the controls for first thru eighth sensor switches S1-S8. Thus, according to the illustrated embodiment, fixed stimulator 210ii is configured to consecutively and repetitiously apply to three configurations of variable sensor 220ii, a fixed stimulus current of magnitude I, which is divided amongst the selected first thru eight BJTs QA-QH into current I, I/4 and I/8 depending on the phase.

In order to maintain a lower current I, as opposed to a higher current 8I, in fixed stimulator 210*ii*, the emitter area of first thru eighth BJTs QA-QH may be one-eighth ($\frac{1}{8}^{th}$) the size of the emitter area of BJT Q1 in fixed sensor 220*i* to increase the current density generated by lower current I. Thus, in the first configuration when Phase1 is high, the current density in each of first thru eight BJTs QA-QH is I. In the second configuration when Phase2 is high, the current density in each of first thru fourth BJTs QA-QD is 2I. In the third configuration when Phase3 is high, the current density in first BJT QA is 8I given that the current I flows through an emitter that is $\frac{1}{8}^{th}$ the size of Q1. The current density ratios developed in first BJT QA are 2:1 and 8:1.

There are numerous alternative embodiments for stimulator 210 and sensor 220, including a combination of the embodiments presented in FIGS. 4*i* and 4*ii* where both stimulator 210 and sensor 220 are variable. Such an embodiment may use DEM to select stimulator elements and sensor elements. In other embodiments both stimulator 210 and sensor 220 may be fixed. For example three BJTs may each be biased with different stimulus currents.

Having discussed two embodiments of stimulator 210 and sensor 220, an embodiment of sampler 230 and signal generator 240, and specifically an embodiment of sigma delta modulator with sampler 270, will now be discussed. FIG. 5*a* illustrates an exemplary first stage of a sigma delta modulator 270 with sampler in accordance with an embodiment of the invention. First stage 270*a* comprises 25 stage one switches sa-sy, differential op amp 510 and capacitors C, 6C, 7C, Cfb and Cint1, where a leading number indicates magnitude. For example, capacitor 6C is six times larger than capacitor C. As another example, capacitor 3Cfb is three times larger than capacitor Cfb. The actual sizes of capacitors will vary among embodiments. All capacitors described herein may be implemented with a MOS capacitor, a metal-insulator-metal (MIM) capacitor, other integrated circuit technology capacitors or discrete capacitors.

Accuracy of temperature detection system 200*i*, 200*ii* may be improved by closely matching capacitors. However, the impact of mismatches can be reduced by using dynamic element matching (DEM), e.g., by having smaller capacitors, e.g., size C or smaller, and selecting these smaller capacitors randomly or in a particular pattern to form necessary capacitors, e.g., C, 6C, 7C, Cfb. DEM may dither, average or randomize mismatch between capacitors to reduce or eliminate errors caused by mismatches.

First stage integrator is formed by cross-coupled feedback capacitors Cint1 and op amp 510. Since bandwidth is relatively low, a general op amp with a low offset may suffice, although requirements may vary between embodiments. Op amp 510 and capacitors Cint1 form a differential cross-coupled feedback integrator having its input controlled by stage one switches sx, sy and having as its output Int1+ and Int1− coupled to second stage 270*b* shown in FIG. 5*b*. The input reference offset of op amp 510 may affect the accuracy of signal processing. Well-known chopping technology may be implemented at the input and output of op amp 510 to reduce the impact on accuracy. Chopping may be implemented by a set of switches to swap the input and output polarity of op amp 510. Since both input and output polarity swap at the same time, any offset will change polarity and be canceled. The chopping frequency should be lower than the loop bandwidth in order to improve offset cancelation by averaging any offset in opposite polarities.

It may be observed that first stage 270*a* is divided into positive and negative sides. On the positive side, a first set of capacitors Cfb, C, 7C and 6C is coupled (thru stage one switch sx) to the positive polarity input of op amp 510. On the negative side a second set of capacitors Cfb, C, 7C and 6C is coupled (thru stage one switch sy) to the negative polarity input of op amp 510. During operation, samples taken from sensor 220 are sampled and held in capacitors having the proper magnitude and polarity shown in Equation 3.8. In this embodiment, switches are closed and held when switch controls are high. Stage one switches sa-sy are controlled by control signals illustrated in FIG. 5*c*.

FIG. 5*c* illustrates exemplary control of first and second stages of a sigma delta modulator with sampler in accordance with an embodiment of the invention. In FIG. 5*c*, control signals include phi1, phi2, Phi3, phi4, phase1, phase2, phase3, phase 1_b, phase2_b and phase3_b. Control signals phase1, phase2 and phase3 have already been presented in FIGS. 4*i* and 4*ii*. Control signals phase1, phase2 and phase3 are used to sample the responses of sensor 220 in response to stimulation by stimulator 210. Inverted control signals phase1_b, phase2_b and phase3_b are inverted versions of phase1, phase2 and phase3. Phi2 is an inverted version of Phi1. Phi4 is an inverted version of Phi3. Phi1 and Phi2 are for the first stage of sampling and integration for delta sigma modulator with sampler 270. Phi3 and Phi4 are for the second stage of sampling and integration for delta sigma modulator with sampler 270.

As indicated in FIGS. 4*i*, 5*a* and 5*c*, during operation of first stage 270*a*, in a first phase of the four-phase cycle, stage one switches sb, sc, sg, si, sl, sm, sp, sr, su, sv and sw are closed. As a result, sensor 220*i* is stimulated with a first stimulus current of magnitude I and a first sample $V_{BE1}$ is sampled and held to capacitor 6C on the negative side of first stage 270*a* in accordance with Equation 3.8.

In a second phase of the four-phase cycle, stage one switches sa, sd, sg, sj, sk, sn, so, sr, su, sx and sy are closed. As a result, sensor 220*i* is stimulated with a second stimulus current of magnitude 2I and a second sample $V_{BE2}$ is sampled and held to capacitor 7C on the positive side of first stage 270*a* in accordance with Equation 3.8. At the end of the second phase, the charge on positive integrator feedback capacitor Cint1 is 7C multiplied by second sample $V_{BE2}$ and the charge on negative integrator feedback capacitor Cint1 is 6C multiplied by first sample $V_{BE1}$.

In a third phase of the four-phase cycle, stage one switches sb, sc, sh, si, sk, sn, sp, sq, su, sv and sw are closed. As a result, sensor 220*i* is stimulated with a third stimulus current of magnitude 8I and a third sample $V_{BE3}$ is sampled and held to capacitor C on the negative side of first stage 270*a* in accordance with Equation 3.8. At the end of the fourth phase, the charge on positive integrator feedback capacitor Cint1 is 7C multiplied by second sample $V_{BE2}$ and the charge on negative integrator feedback capacitor Cint1 is 6C multiplied by first sample $V_{BE1}$ plus C multiplied by third sample $V_{BE1}$. The total charge on positive and negative integrator feedback capacitors Cint1 is in accordance with Equation 3.8.

In a fourth phase of the four-phase cycle, stage one switches sb, sc, se or sf, sg, si, sk, sn, sp, sr, ss or st, sx and sy are closed. As shown in second stage 270*b* in FIG. 5*b*, an output bitstream BS from second stage 270*b* determines whether switches se or sf and whether switches ss or st are closed. This decides which ones of first stage switches se, sf, ss, st and second stage switches s2*e*, s2*f*, s2*g*, s2*h* close during the fourth phase. This decides which feedback capacitor Cfb is charged by bandgap reference voltage $V_{REF}$. It also decides which first phase cross-coupled feedback capacitor Cint1 that bandgap voltage reference $V_{REF}$*Cfb is integrated to. Bandgap reference voltage VREF may be generated by any known technique, such as the technique shown in FIG. 1.

FIG. 5b illustrates an exemplary second stage 270b of sigma delta modulator with sampler 270 in accordance with an embodiment of the invention. Second stage 270b comprises 13 stage two switches s2a-s2m, differential op amp 520, comparator 530, flip flop 540, AND gates 551, 552 and second stage capacitors 2C2, 3C2 and Cint2, where a leading number indicates magnitude. For example, capacitor 3C2 is 1.5 times larger than capacitor 2C2.

Second stage cross-coupled feedback capacitors Cint2 have a magnitude three times larger than capacitor 2C2, which is why FIG. 5b indicates in second stage cross-coupled feedback capacitors that Cint2=6C2. The actual sizes of capacitors will vary among embodiments. Op amp 520 and second stage cross-coupled feedback capacitors Cint2 form a second stage differential cross-coupled feedback integrator having its input controlled by stage two switches s2l, s2m. The output of this stage two is coupled to the input of comparator 530. It may be observed that second stage 270b is divided into positive and negative sides. On the positive side, a first set of capacitors 2C2 and 3C2 is coupled (thru stage two switch s2l) to the positive polarity input of op amp 520. On the negative side a second set of capacitors 2C2 and 3C2 is coupled (thru stage two switch s2m) to the negative polarity input of op amp 520. During operation, second stage 270b receives the output of first stage 270a Int1+, Int1−. In this embodiment, switches are closed and held when switch controls are high. Stage two switches s2a-s2m are controlled by control signals illustrated in FIG. 5c.

FIG. 5c illustrates exemplary control of first and second stages of a sigma delta modulator with sampler in accordance with an embodiment of the invention. In FIG. 5c, control signals include phi1, phi2, Phi3, phi4, phase1, phase2, phase3, phase 1_b, phase2_b and phase3_b. Control signals phase1, phase2 and phase3 have already been presented in FIGS. 4i and 4ii. Control signals phase1, phase2 and phase3 are used to sample the responses of sensor 220 in response to stimulation by stimulator 210. Inverted control signals phase 1_b, phase2_b and phase3_b are inverted versions of phase1, phase2 and phase3. Phi2 is an inverted version of Phi1. Phi4 is an inverted version of Phi3. Phi1 and Phi2 are for the first stage of sampling and integration for delta sigma modulator with sampler 270. Phi3 and Phi4 are for the second stage of sampling and integration for delta sigma modulator with sampler 270. Although the frequency of the number of phases and cycle frequency may vary between embodiments, in one embodiment, the frequency of Phi1 may be 50 kHz.

As indicated in FIGS. 4i, 5a and 5c, during operation of second stage 270b, in first, second and third phases of the four-phase cycle, stage two switches s2a, s2b, s2i, s2j and s2k are closed. As a result, the input Int1+, Int1−, which is the output of first stage 270a, charges second stage capacitors 3C2.

In a fourth phase of the four-phase cycle, stage two switches s2c, s2d, s2e or s2f, s2g or s2h, s2l and s2m are closed. As a result, the charge on capacitors 3C2 is integrated to switched capacitor feedback capacitors Cint2, having a size indicated by 6C2. Comparator 530 compares the positive and negative charges on second stage cross-coupled feedback capacitors Cint2 to output a 1 or 0. During the following first, second and third phases, flip flop 540 receives a rising edge and captures the 1 or 0 output by comparator 530. The 1 or 0 is output as bitstream BS and its inverted value is output as BSb. During every fourth phase when Phi4 is high, the output of flip flop 530 causes one of AND gates 551, 552 to output a high value on one of AND gate outputs fb_1 and fb_0. This decides which ones of first stage switches se, sf, ss, st and second stage switches s2e, s2f, s2g, s2h close during the fourth phase. This decides whether positive or negative side feedback capacitor Cfb is charged by bandgap reference voltage $V_{REF}$. It also decides which first phase cross-coupled feedback capacitor Cint1 that bandgap voltage reference $V_{REF}$*Cfb is integrated to. As shown in second stage 270b in FIG. 5b, second stage 270b generates output bitstream BS.

Through the feedback loop of sigma-delta modulator with sampler 270a, 270b, 270c, on first stage cross-coupled feedback capacitors Cint1 the charge accumulated due to the integration of $-6C^*V_{BE1}+7C^*V_{BE2}-C^*V_{BE3}$ is accompanied by the charge accumulated due to the integration of bitstream BS*bandgap reference voltage $V_{REF}$*feedback capacitor Cfb. Accordingly, the output bitstream BS of sigma delta modulator with sampler 270 is given by Equation 5.1.

$$BS = \frac{-6V_{BE1}+7V_{BE2}-V_{BE3}}{V_{REF}} \cdot \frac{C}{Cfb} = \frac{k\ln(16)}{q} \cdot \frac{C}{Cfb \cdot V_{ref}} \cdot T \quad \text{Equation 5.1}$$

As shown in second stage 270b in FIG. 5b, output bitstream BS is output to digital filter 280 to remove high frequency noise caused by sigma delta modulator 270. Bitstream BS represents the scaled signal proportional to temperature, e.g., $V_{PTAT}$, in digital form. Finally, voltage to temperature converter 250 converts the output of digital filter 280 to a temperature measured in Kelvins. So that the output of voltage to temperature converter 250 TEMP is equivalent to temperature T, the gain of voltage to temperature converter 250 is given by Equation 5.2.

$$\text{Temperature Converter Gain} = \frac{q}{k\ln(16)} \cdot \frac{Cfb \cdot V_{REF}}{C} \quad \text{Equation 5.2}$$

There are many design, cost and/or performance advantages provided by embodiments of the invention relative to conventional temperature detection components and systems. Temperature accuracy is improved, conversion gain may be increased without increasing current density and parasitic resistance errors and other problems with conventional bandgap reference temperature sensors may be eliminated by generating a signal proportional to temperature from three samples, where the signal is defined as a difference between a first difference and a second difference, the first difference comprising a difference between a second sample and a first sample, the second difference comprising a difference between a third sample and the first sample, and where the signal is defined to cancel parasitic components in the first, second and third samples.

Problems with conventional temperature sensors may be reduced or eliminated by selecting stimulator, sensor and the sensor stimulation and signal processing algorithm. Some problems may be eliminated by the choice of sensor, some problems may be eliminated by the choice of stimulator and still other problems may be eliminated by the choice of stimulation and signal processing algorithm. Regarding selection of sensor, a temperature sensor comprising a single transistor may eliminate problems with conventional temperature sensors. As one example, there is no problem involving a mismatch between multiple transistors if sensor comprises only one transistor.

Problems may also be eliminated by the choice of stimulator to stimulate sensor. For example, avoiding the use of an op amp in the stimulator avoids offset caused by an op amp. Further, mismatch between multiple bias currents or failure to implement a particular bias current ratio in a processing algorithm may be reduced or eliminated by using a variable stimulator. A variable stimulator may comprise a plurality of selectable transistors, e.g., MOSFET current branches. Selecting among available current branches may dither, average or randomize mismatch between current branches to reduce or eliminate bias current mismatch.

Problems may also be eliminated by the choice of stimulation and signal processing algorithm. The stimulation and signal processing algorithm may reduce or eliminate parasitic resistance in temperature sensor junction voltage samples and may provide a higher conversion gain without increasing current density ratio. Some embodiments of the invention permit a higher conversion gain without increasing the current density ratio.

While more than three samples may be taken and processed, the primary benefit of more than three samples would be to remove random mismatch errors. Randomizing elements such as transistors in the configuration of stimulator 210 and sensor 220 and capacitors in sampler 230 and signal generator 240 may also remove random mismatch errors.

The foregoing represents only a few of many possible sensor, stimulator, sampler and signal processing embodiments. Each embodiment illustrated and discussed herein, as well as many other embodiments within the scope of inventions disclosed herein, may be described in a variety of general and specific descriptions with or without using the exact description provided herein. The embodiments presented are not limiting. Rather, they are an introduction to many embodiments falling within the scope of the inventions described herein. A series of descriptions of embodiments of the inventions are provided below. Like the embodiments, these descriptions are not limiting. Rather, these descriptions are simply a few of many ways to generally and specifically describe embodiments within the scope of the inventions disclosed herein.

A method in accordance with an embodiment of the invention may comprise, for example, sampling a temperature sensor to generate first, second and third samples and generating a signal proportional to temperature from the first, second and third samples, where the signal is defined as a difference between a first difference and a second difference, the first difference comprising a difference between the second sample and the first sample, the second difference comprising a difference between the third sample and the first sample, and where the signal is defined to cancel parasitic components in the first, second and third samples.

Each of the temperature sensor and the temperature sensor stimulator may be fixed or variable, e.g., reconfigurable into a first, second and third configuration, in any combination thereof. Some embodiments may reconfigure a reconfigurable stimulator into a first, second and third configuration to generate a first, second and third stimulus; apply the first, second and third stimulus to the temperature sensor; and generate, by the temperature sensor, first, second and third responses, respectively, from the applied first, second and third stimulus, wherein sampling generates the first, second and third samples, respectively, from the first, second and third responses. Each of the first, second and third configuration of the reconfigurable stimulator may comprise a different number of transistors that respectively generate the first, second and third stimulus. A reconfigurable stimulator may use dynamic element matching (DEM) to reconfigure the reconfigurable stimulator. Each stimulus may be the same or may have a different magnitude compared to each other stimulus.

Some embodiments may reconfigure a reconfigurable temperature sensor into a first, second and third configuration to generate first, second and third responses to a first, second and third stimulus, wherein sampling generates the first, second and third samples, respectively, from the first, second and third responses. Each of the first, second and third configurations of the reconfigurable temperature sensor may comprise a different number of transistors that respectively generate the first, second and third responses. A reconfigurable sensor may use dynamic element matching (DEM) to reconfigure the reconfigurable sensor. The magnitude of one or more of the first, second and third samples may be adjusted to cancel parasitic components. For example, sampling a temperature sensor to generate a set of samples may comprise sampling the first second and third samples to capacitors having different magnitudes. Dynamic element matching (DEM) may be used to reconfigure a reconfigurable stimulator, temperature sensor, sampling capacitors, etc. Sampling may be performed serially or in parallel, such as where there are multiple sensors.

A device in accordance with an embodiment of the invention may comprise, for example, a signal generator that generates a signal proportional to temperature from first, second and third samples of a temperature sensor, where the signal is defined as a difference between a first difference and a second difference, the first difference comprising a difference between the second sample and the first sample, the second difference comprising a difference between the third sample and the first sample, and where the signal is defined to cancel parasitic components in the first, second and third samples. A signal generator may adjust the magnitude of at least one of the first, second and third samples to cancel parasitic components, e.g., by multiplying a first or second difference to cancel parasitic components.

Some devices may comprise a sampler that samples a temperature sensor to generate a set of samples comprising first, second and third samples. Some device may comprise a reconfigurable stimulator reconfigurable into a first configuration, a second configuration and a third configuration to generate, respectively, a stimulus comprising a first stimulus, a second stimulus and a third stimulus; and a temperature sensor comprising a single transistor that generates a first response, a second response and third response in response to being stimulated, respectively, by the first stimulus, the second stimulus and the third stimulus, wherein the temperature sensor generates the first sample, the second sample and the third sample, respectively, by sampling the first response, the second response and the third response. Some device may comprise a stimulator that generates a stimulus; and a reconfigurable temperature sensor reconfigurable into a first configuration stimulated by the stimulus, a second configuration stimulated by the stimulus and a third configuration stimulated by the stimulus to generate, respectively a first response, a second response and third response, wherein the temperature sensor generates the first sample, the second sample and the third sample, respectively, by sampling the first response, the second response and the third response. Some devices may comprise a first capacitor of a first magnitude that holds the first sample; a second capacitor of a second magnitude that holds the second sample; and a third capacitor of a third magnitude that holds the third sample. Some devices may comprise a differential integrator having a positive and a negative terminal, where the first, second and third capacitors are selectively coupled to one of the positive terminal and the negative terminal based on the definition of the signal.

A device, as defined herein, is a machine or manufacture as defined by 35 U.S.C. §101. A device may comprise, for example but not limited to, a circuit, stimulator, sensor, sampler, signal generator, voltage to temperature converter, temperature detector, temperature detection system, modulator, filter, amplifier, ADC, etc. Many embodiments may use different temperature sensor and sensor stimulating devices, such as, but not limited to, one or more of a BJT, heterojunction bipolar transistor (HBT), a metal oxide field effect transistor (MOSFET) device, metal semiconductor field effect transistor (MESFET) device or other transconductor or transistor technology device. Such alternative devices may require alternative configurations other than the configuration illustrated in embodiments presented herein.

Techniques described herein may be implemented in hardware (digital and/or analog hardware) or a combination of hardware, software and/or firmware. Techniques described herein may be implemented in one or more components. Embodiments of the invention may comprise computer program products comprising logic (e.g., in the form of program code or software as well as firmware) stored on any computer useable medium, which may be integrated in or separate from other components. Such program code, when executed in one or more processors, causes a device to operate as described herein. Devices in which embodiments may be implemented may include storage, such as storage drives, memory devices, and further types of computer-readable media. Examples of such computer-readable media include, but are not limited to, a hard disk, a removable magnetic disk, a removable optical disk, flash memory cards, digital video disks, random access memories (RAMs), read only memories (ROM), and the like. In greater detail, examples of such computer-readable media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable media may, for example, store computer program logic, e.g., program modules, comprising computer executable instructions that, when executed, provide and/or maintain one or more aspects of functionality described herein with reference to FIGS. 2-6, as well as any and all components, steps and functions therein and/or further embodiments of the present invention described herein.

Proper interpretation of subject matter described herein and claimed hereunder is limited to patentable subject matter under 35 U.S.C. §101. Subject matter described in and claimed based on this patent application is not intended to and does not encompass unpatentable subject matter. As described herein and claimed hereunder, a method is a process defined by 35 U.S.C. §101. As described herein and claimed hereunder, each of a circuit, device, converter, apparatus, machine, system, computer, module, media and the like is a machine and/or manufacture defined by 35 U.S.C. §101.

While the present invention has been described with respect to a limited number of embodiments, those skilled in the art will appreciate numerous modifications and variations there from. Embodiments have been presented by way of example only, and not limitation. It will be apparent to persons skilled in the relevant art(s) that various changes in form and details can be made therein without departing from the spirit and scope of the invention. The exemplary appended claims encompass embodiments and features described herein, modifications and variations thereto as well as additional embodiments and features that fall within the true spirit and scope of this present invention.

What is claimed:

1. A method comprising:
   sampling a temperature sensor to generate first, second and third samples; and
   generating a signal proportional to temperature from the first, second and third samples, where the signal is defined as a difference between a first difference and a second difference, the first difference comprising a difference between the second sample and the first sample, the second difference comprising a difference between the third sample and the first sample, and where the signal is defined to cancel parasitic components in the first, second and third samples.

2. The method of claim 1, further comprising:
   reconfiguring a reconfigurable stimulator into a first, second and third configuration to generate a first, second and third stimulus; and
   applying the first, second and third stimulus to the temperature sensor;
   generating, by the temperature sensor, first, second and third responses, respectively, from the applied first, second and third stimulus, wherein sampling generates the first, second and third samples, respectively, from the first, second and third responses.

3. The method of claim 2, wherein reconfiguring the reconfigurable stimulator comprises using dynamic element matching (DEM) to reconfigure the reconfigurable stimulator.

4. The method of claim 2, wherein the first, second and third stimulus have different magnitudes.

5. The method of claim 4, wherein each of the first, second and third configuration of the reconfigurable stimulator comprises a different number of transistors that respectively generate the first, second and third stimulus.

6. The method of claim 1, further comprising:
   reconfiguring a reconfigurable temperature sensor into a first, second and third configuration to generate first, second and third responses to a first, second and third stimulus, wherein sampling generates the first, second and third samples, respectively, from the first, second and third responses.

7. The method of claim 6, wherein reconfiguring the reconfigurable temperature sensor comprises using dynamic element matching (DEM) to reconfigure the reconfigurable temperature sensor.

8. The method of claim 6, wherein the first, second and third stimulus have different magnitudes.

9. The method of claim 6, wherein each of the first, second and third configuration of the reconfigurable temperature sensor comprises a different number of transistors that respectively generate the first, second and third responses.

10. The method of claim 1, further comprising:
    adjusting the magnitude of at least one of the first, second and third samples to cancel parasitic components.

11. The method of claim 10, wherein sampling a temperature sensor to generate a set of samples comprises:
    sampling the first sample to a first capacitor of a first magnitude;
    sampling the second sample to a second capacitor of a second magnitude; and
    sampling the third sample to a third capacitor of a third magnitude.

12. The device of claim 11, wherein the sampling of the first, second and third samples is performed serially.

13. The method of claim 11, further comprising:
forming first, second and third capacitors using dynamic element matching (DEM).

14. A device comprising:
a sampler that samples a temperature sensor to generate a set of samples comprising first, second and third samples;
a signal generator that generates a signal proportional to temperature from the first, second and third samples, where the signal is defined as a difference between a first difference and a second difference, the first difference comprising a difference between the second sample and the first sample, the second difference comprising a difference between the third sample and the first sample, and is defined to cancel parasitic components in the first, second and third samples.

15. The device of claim 14, further comprising:
a reconfigurable stimulator reconfigurable into a first configuration, a second configuration and a third configuration to generate, respectively, a stimulus comprising a first stimulus, a second stimulus and a third stimulus; and
a temperature sensor comprising a single transistor that generates a first response, a second response and third response in response to being stimulated, respectively, by the first stimulus, the second stimulus and the third stimulus, wherein the temperature sensor generates the first sample, the second sample and the third sample, respectively, by sampling the first response, the second response and the third response.

16. The device of claim 15, wherein the signal generator comprises:
a differential integrator having a positive and a negative terminal, wherein the first, second and third capacitors are selectively coupled to one of the positive terminal and the negative terminal based on the definition of the signal.

17. The device of claim 14, further comprising:
a stimulator that generates a stimulus; and
a reconfigurable temperature sensor reconfigurable into a first configuration stimulated by the stimulus, a second configuration stimulated by the stimulus and a third configuration stimulated by the stimulus to generate, respectively a first response, a second response and third response, wherein the temperature sensor generates the first sample, the second sample and the third sample, respectively, by sampling the first response, the second response and the third response.

18. The device of claim 14, wherein the sampler comprises:
a first capacitor of a first magnitude that holds the first sample;
a second capacitor of a second magnitude that holds the second sample; and
a third capacitor of a third magnitude that holds the third sample.

19. A device comprising:
a signal generator that generates a signal proportional to temperature from first, second and third samples of a temperature sensor, where the signal is defined as a difference between a first difference and a second difference, the first difference comprising a difference between the second sample and the first sample, the second difference comprising a difference between the third sample and the first sample, and where the signal is defined to cancel parasitic components in the first, second and third samples.

20. The device of claim 19, wherein the signal generator adjusts the magnitude of at least one of the first, second and third samples to cancel parasitic components.

* * * * *